(12) United States Patent
Schreiber

(10) Patent No.: US 12,198,729 B2
(45) Date of Patent: Jan. 14, 2025

(54) SYSTEM AND METHOD FOR DYNAMIC, DATA-DRIVEN VIDEOS

(71) Applicant: BLINGS IO LTD, Tel Aviv (IL)

(72) Inventor: Yonatan Schreiber, Tel Aviv (IL)

(73) Assignee: BLINGS IO LTD, Tel Aviv (IL)

( * ) Notice: Subject to any disclaimer, the term of this patent is extended or adjusted under 35 U.S.C. 154(b) by 0 days.

(21) Appl. No.: 18/260,478

(22) PCT Filed: Dec. 28, 2021

(86) PCT No.: PCT/IL2021/051543
§ 371 (c)(1),
(2) Date: Jul. 6, 2023

(87) PCT Pub. No.: WO2022/149124
PCT Pub. Date: Jul. 14, 2022

(65) Prior Publication Data
US 2024/0055025 A1 Feb. 15, 2024

Related U.S. Application Data

(60) Provisional application No. 63/199,574, filed on Jan. 10, 2021.

(51) Int. Cl.
*G11B 27/00* (2006.01)
*G06F 40/14* (2020.01)
(Continued)

(52) U.S. Cl.
CPC ............ *G11B 27/031* (2013.01); *G06F 40/14* (2020.01); *H04N 21/458* (2013.01)

(58) Field of Classification Search
CPC ...... G11B 27/031; G06F 40/14; G06F 3/0481; G06F 3/0484; H04N 21/458;
(Continued)

(56) References Cited

U.S. PATENT DOCUMENTS 8,522,289 B2 * 8/2013 Athsani ............ H04N 21/21805
725/87
9,330,719 B2 * 5/2016 Axen .................. H04N 21/6582
(Continued)

FOREIGN PATENT DOCUMENTS

CN 107430437 A * 12/2017 .............. G06F 1/163
WO WO-2005024614 A1 * 3/2005 .............. H04L 29/06
(Continued)

*Primary Examiner* — Laurie A Ries
(74) *Attorney, Agent, or Firm* — S.J. Intellectual Property LTD.

(57) ABSTRACT

A system and method for dynamic video web generation includes: obtaining a video specification including definitions of graphical elements and their movement; receiving dynamic data of an end user of the web browser; changing traits of one or more of the graphical elements in the video specification according to the dynamic data; converting the graphical elements and their traits in the video specification, as well as audio and video definitions, to visual and auditory elements in a Document Object Model (DOM) file of the web browser; and applying the movement of the graphical elements defined in the video specification to the visual elements, according to a predefined frame rate, to generate, at the frame rate, frames of an interactive, dynamic video including the visual and audio elements, and consecutively displaying the frames in the web browser.

20 Claims, 7 Drawing Sheets

(51) Int. Cl.
 *G11B 27/031* (2006.01)
 *H04N 21/458* (2011.01)
(58) Field of Classification Search
 CPC ....... H04N 21/44224; H04N 21/47815; H04N 21/4782; H04N 21/6582
 See application file for complete search history.

(56) References Cited

U.S. PATENT DOCUMENTS

| | | | |
|---|---|---|---|
| 10,887,645 B2* | 1/2021 | Stockhammer | H04L 67/561 |
| 2003/0174243 A1* | 9/2003 | Arbeiter | H04N 21/6582 |
| | | | 375/E7.199 |
| 2006/0004778 A1* | 1/2006 | Lamkin | H04L 67/02 |
| 2010/0306643 A1* | 12/2010 | Chabot | G06F 16/95 |
| | | | 715/234 |
| 2012/0151408 A1* | 6/2012 | Groth | G06F 16/95 |
| | | | 715/799 |
| 2013/0125181 A1* | 5/2013 | Montemayor | H04N 21/25825 |
| | | | 725/93 |
| 2014/0026023 A1 | 1/2014 | Cabanier | |
| 2014/0047413 A1 | 2/2014 | Sheive et al. | |
| 2014/0186010 A1* | 7/2014 | Guckenberger | G11B 27/11 |
| | | | 386/248 |
| 2015/0318018 A1* | 11/2015 | Kaiser | H04N 21/47205 |
| | | | 386/241 |
| 2015/0363505 A1 | 12/2015 | Dewa | |
| 2016/0012859 A1* | 1/2016 | Harader | G06V 20/41 |
| | | | 386/241 |
| 2019/0174191 A1* | 6/2019 | Abbas | H04N 21/8583 |
| 2021/0136458 A1* | 5/2021 | Carney | H04N 21/47202 |
| 2023/0350202 A1* | 11/2023 | Mayrand | H04N 21/25858 |

FOREIGN PATENT DOCUMENTS

| | | |
|---|---|---|
| WO | 2016/174585 A1 | 11/2016 |
| WO | 2020/139923 A1 | 7/2020 |
| WO | WO-2021101934 A1 * | 5/2021 |

* cited by examiner

SYSTEM AND METHOD FOR DYNAMIC, DATA-DRIVEN VIDEOS

FIELD OF THE INVENTION

The presently disclosed subject matter generally relates to the field of real-time video download and presentation and in particular to dynamic video.

BACKGROUND

Videos and animations on the web are used for a wide range of applications, including entertainment, education, and product marketing. The end user experience when viewing such videos and animations may be enhanced by personalization, that is, inclusion within the video and/or animation of details particular for a given end user. For example, an electronic greeting card may be sent in which an end user's name is incorporated into the video and/or animation of the card. A utility company may send a customer a video showing the customer his personal expenditures by means of animation. Such videos may include generic elements sent to all recipients as well as dynamic elements sent to a particular end user. The experience may be further enhanced by allowing the user to interact with the video, and change its content upon demand while viewing it. For example, a company can send a video that presents three products, and the user can click on one of them in order to get detailed information about it, or open a purchase page.

To create such personalized, dynamic or interactive videos, an animation/video editing platform (hereinbelow, an "animation editing platform") is typically used to create a base design with labelled graphical elements are then be substituted for personal data. An example of such an animation editing platform is Adobe AfterEffects™ (hereinbelow, "AE"). The labelled elements are subsequently replaced by personal end user data. A company with multiple customers may order a personalized video that is to be sent to the customers. To implement the order, a file of customer records is provided to the operators of the animation editing platform. For each customer record, the animation editing platform is run to add the personal data to the base design and to render a video file that includes the personal data. For example, the video file may be a video file in an mp4 file format.

Each personalized video file is then delivered or streamed to the appropriate customer when requested by that customer. For example, customers of an electric company may login from a personal webpage of the utility company identifying information and then receive the mp4 file with his monthly electrical consumption, streamed to the browser.

Typically the personalized video files are created before being requested by customers, given that the rendering process of creating mp4 video files is time consuming and customers typically would not wait for the process to complete if it were done only after a request for the file is made. The advance preparation of such videos may therefore require significant computer processing time, as well as requiring significant computer storage resources for all the personalized video files that are created and must be maintained. These requirements point to a shortcoming of such a system for personalized videos, in that scaling the system to handle a large distribution is not trivial, requiring significant enhancement of processing and storage capabilities. Similar problems to those described above for personalizing videos also exist if videos are to include video variations that are presented to an end user according to a user's interactive selections in real time, or variations based on other types of dynamic data, such as changing news.

An additional shortcoming of the typical process for creating personalized videos is that the animation platform editors must also have access to the personal data of the customers (i.e., the end users) in order to incorporate such data into the personalized videos.

In order to add interactivity to the video, a typical solution might be to add a transparent layer of HTML buttons that will be visible on a specific time range of the video. Clicking on the button, will load a new video that will replace the existing video. A shortcoming of this technique is that the HTML buttons are designed by the developer of the hosting video platform or player, and not by the video designer of the specific video, and those buttons are displayed without animation and without a visual similarity to the design of the video, which impairs the overall video experience. Another shortcoming is in loading the next scene dynamically, which means that the browser needs to load another video and wait for it to download, or alternatively load multiple videos at the beginning which might have significant loading time.

These shortcomings and others are addressed by embodiments of the presently disclosed subject matter.

SUMMARY

Embodiments of the presently disclosed subject matter provide a system and methods for generating dynamic, data-driven videos in a web browser accessed by an end user. Methods provided include steps of obtaining a video specification including definitions of visual and/or audio elements, their temporal changes, and interactive controls; and providing a web browser-based program to implement steps of: receiving the video specification; receiving dynamic data associated with an end user of the web browser; changing traits of one or more of the definitions in the video specification according to the dynamic data; converting the visual and audio elements and their traits in the video specification to elements in a Document Object Model (DOM) of the web browser; applying movement and styling of the video and audio elements defined in the video specification to the DOM elements, according to a predefined frame rate, to generate, at the frame rate, frames of a dynamic video including the video and audio elements; syncing audio and video-footage playback to the frames; and consecutively displaying the frames of the dynamic video in the web browser.

In some embodiments, the dynamic data may be personal data of the end user. The web browser-based program may be coded in JavaScript. The video specification may be formatted as JavaScript Object Notation (JSON). Traits of elements in the JSON video specification may include labelled definitions of one or more of a text string, a text size, a graphical element color, a video file, an image, a visibility or invisibility trait of a graphical element, a speed of movement of a graphical element, a call-to-action callback instruction, and an interface control. The video specification may be a merged JSON video specification created by receiving multiple JSON video specifications and merging them as multiple simultaneous layers of the merged JSON video specification. The video specification may be a concatenated JSON video specification created by receiving multiple JSON video specifications and concatenating the multiple JSON video specifications as scenes of the concatenated JSON video specification.

The video specification may be a JSON video specification created by converting output of an animation editing platform to a JSON format. Receiving the dynamic data may include getting one or more of text, personal information, and images, from one or more of 1) content loaded with loading of webpage, and 2) connections to other internet accessible sites by application programming interfaces (APIs). The internet accessible sites may include a customer relationship management (CRM) site.

Embodiments may further include receiving a parameter of performance with respect to a response of the end user to the dynamic video and responsively modifying the dynamic data to improve the performance. Embodiments may also include pre-loading one or more audio and/or video files specified in the video specifications and presenting in the web browser frames of the audio and/or video files synchronized as additional layers with the frames of the dynamic video including the SVG elements.

Creating the SVG elements may include creating a layer order in the DOM file.

Further embodiments may include defining, in the DOM, interactive parts and elements with one or more call-back functions. The call-back functions may perform one or more of navigating to a web page and jumping to a different scene of the dynamic video. The call-back functions may be directed by pre-defined logical conditions.

Creating the SVG elements may include creating one or more SVG effect definitions of a filter, a mask, or a clip-path. Creating the SVG elements may also include creating a container <g/> element in the DOM file and/or creating a transform matrix specifying one or more of a position, translation, rotation, scale, and skew of the SVG elements. Converting the definitions of graphical elements in the video specification to SVG elements may include defining element types and styles of the SVG elements. The traits may include styling elements including one or more of a fill color and a fill opacity. Vector based graphical elements may also be created using SVG elements.

Further embodiments of the presently disclosed subject matter provide a system for generating dynamic, data-driven videos in a web browser. The system includes a processor and associated memory including instructions that when executed by the processor implement steps of: receiving a video specification including definitions of visual and audio elements, their temporal changes, and interactive reactions; receiving dynamic data associated with an end user of the web browser; changing traits of one or more of the definitions in the video specification according to the dynamic data; converting the visual and audio elements and their traits in the video specification to elements in a Document Object Model (DOM) of the web browser; applying movement and styling of the video and audio elements defined in the video specification to the DOM elements, according to a predefined frame rate, to generate, at the frame rate, frames of a dynamic video including the video and audio elements; syncing audio and video-footage playback to the frames; and consecutively displaying the frames of the dynamic video in the web browser.

In accordance with a first aspect of the presently disclosed subject matter, there is provided a method for generating dynamic, data-driven videos in a web browser accessed by an end user, the method comprising: obtaining a video specification including definitions of visual and/or audio elements, their temporal changes, and interactive controls; and providing a web browser-based program to implement steps of: receiving the video specification; receiving dynamic data associated with an end user of the web browser; changing traits of one or more of the definitions in the video specification according to the dynamic data; converting the visual and audio elements and their traits in the video specification to elements in a Document Object Model (DOM) of the web browser; applying movement and styling of the video and audio elements defined in the video specification to the DOM elements, according to a predefined frame rate, to generate, at the frame rate, frames of a dynamic video including the video and audio elements; syncing audio and video-footage playback to the frames; and consecutively displaying the frames of the dynamic video in the web browser.

In some cases, the dynamic data is personal data of the end user.

In some cases, the web browser-based program is coded in JavaScript and wherein the video specification is formatted as JavaScript Object Notation (JSON).

In some cases, traits of elements in the JSON video specification include labelled definitions of one or more of a text string, a text size, a graphical element color, a video file, an image, a visibility or invisibility trait of a graphical element, a speed of movement of a graphical element, a call-to-action callback instruction, and an interface control.

In some cases, the video specification is a merged JSON video specification created by receiving multiple JSON video specifications and merging them as multiple simultaneous layers of the merged JSON video specification.

In some cases, the video specification is a concatenated JSON video specification created by receiving multiple JSON video specifications and concatenating the multiple JSON video specifications as scenes of the concatenated JSON video specification.

In some cases, the video specification is a JSON video specification created by converting output of an animation editing platform to a JSON format.

In some cases, receiving the dynamic data comprises getting one or more of text, personal information, and images, from one or more of 1) content loaded with loading of webpage, and 2) connections to other internet accessible sites by application programming interfaces (APIs).

In some cases, the internet accessible sites include a customer relationship management (CRM) site.

In some cases, the method further comprises receiving a parameter of performance with respect to a response of the end user to the dynamic video and responsively modifying the dynamic data to improve the performance.

In some cases, the method further comprises pre-loading one or more audio and/or video files specified in the video specifications and presenting in the web browser frames of the audio and/or video files synchronized as additional layers with the frames of the dynamic video including the SVG elements.

In some cases, creating the SVG elements further comprises creating a layer order in the DOM file.

In some cases, the method further comprises defining, in the DOM, interactive parts and elements with one or more call-back functions, wherein the call-back functions perform one or more of navigating to a web page and jumping to a different scene of the dynamic video.

In some cases, the method further comprises defining, in the DOM, interactive parts and elements with one or more call-back functions, wherein the call-back functions are directed by pre-defined logical conditions.

In some cases, creating the SVG elements further comprises creating one or more SVG effect definitions of a filter, a mask, or a clip-path.

In some cases, creating the SVG elements further comprises creating a container <g/> element in the DOM file.

In some cases, creating the SVG elements further comprises creating a transform matrix specifying one or more of a position, translation, rotation, scale, and skew of the SVG elements.

In some cases, converting the definitions of graphical elements in the video specification to SVG elements comprises defining element types and styles of the SVG elements.

In some cases, the traits include styling elements including one or more of a fill color and a fill opacity.

In some cases, vector based graphical elements are created using SVG elements.

In accordance with a second aspect of the presently disclosed subject matter, there is provided a system for generating dynamic, data-driven videos in a web browser, the system comprising a processor and associated memory including instructions that when executed by the processor implement steps of: obtaining a video specification including definitions of visual and/or audio elements, their temporal changes, and interactive controls; and providing a web browser-based program to implement steps of: receiving the video specification; receiving dynamic data associated with an end user of the web browser; changing traits of one or more of the definitions in the video specification according to the dynamic data; converting the visual and audio elements and their traits in the video specification to elements in a Document Object Model (DOM) of the web browser; applying movement and styling of the video and audio elements defined in the video specification to the DOM elements, according to a predefined frame rate, to generate, at the frame rate, frames of a dynamic video including the video and audio elements; syncing audio and video-footage playback to the frames; and consecutively displaying the frames of the dynamic video in the web browser.

In some cases, the dynamic data is personal data of the end user.

In some cases, the web browser-based program is coded in JavaScript and wherein the video specification is formatted as JavaScript Object Notation (JSON).

In some cases, traits of elements in the JSON video specification include labelled definitions of one or more of a text string, a text size, a graphical element color, a video file, an image, a visibility or invisibility trait of a graphical element, a speed of movement of a graphical element, a call-to-action callback instruction, and an interface control.

In some cases, the video specification is a merged JSON video specification created by receiving multiple JSON video specifications and merging them as multiple simultaneous layers of the merged JSON video specification.

In some cases, the video specification is a concatenated JSON video specification created by receiving multiple JSON video specifications and concatenating the multiple JSON video specifications as scenes of the concatenated JSON video specification.

In some cases, the video specification is a JSON video specification created by converting output of an animation editing platform to a JSON format.

In some cases, receiving the dynamic data comprises getting one or more of text, personal information, and images, from one or more of 1) content loaded with loading of webpage, and 2) connections to other internet accessible sites by application programming interfaces (APIs).

In some cases, the internet accessible sites include a customer relationship management (CRM) site.

In some cases, the processor is further configured to receive a parameter of performance with respect to a response of the end user to the dynamic video and responsively modify the dynamic data to improve the performance.

In some cases, the processor is further configured to pre-load one or more audio and/or video files specified in the video specifications and present in the web browser frames of the audio and/or video files synchronized as additional layers with the frames of the dynamic video including the SVG elements.

In some cases, creating the SVG elements further comprises creating a layer order in the DOM file.

In some cases, the processor is further configured to define, in the DOM, interactive parts and elements with one or more call-back functions, wherein the call-back functions perform one or more of navigating to a web page and jumping to a different scene of the dynamic video.

In some cases, the processor is further configured to define, in the DOM, interactive parts and elements with one or more call-back functions, wherein the call-back functions are directed by pre-defined logical conditions.

In some cases, creating the SVG elements further comprises creating one or more SVG effect definitions of a filter, a mask, or a clip-path.

In some cases, creating the SVG elements further comprises creating a container <g/> element in the DOM file.

In some cases, creating the SVG elements further comprises creating a transform matrix specifying one or more of a position, translation, rotation, scale, and skew of the SVG elements.

In some cases, converting the definitions of graphical elements in the video specification to SVG elements comprises defining element types and styles of the SVG elements.

In some cases, the traits include styling elements including one or more of a fill color and a fill opacity.

In some cases, vector based graphical elements are created using SVG elements.

In accordance with a third aspect of the presently disclosed subject matter, there is provided a non-transitory computer readable storage medium having computer readable program code embodied therewith, the computer readable program code, executable by at least one processing resource of a computer to perform a method for generating dynamic, data-driven videos in a web browser accessed by an end user, the method comprising: obtaining a video specification including definitions of visual and/or audio elements, their temporal changes, and interactive controls; and providing a web browser-based program to implement steps of: receiving the video specification; receiving dynamic data associated with an end user of the web browser; changing traits of one or more of the definitions in the video specification according to the dynamic data; converting the visual and audio elements and their traits in the video specification to elements in a Document Object Model (DOM) of the web browser; applying movement and styling of the video and audio elements defined in the video specification to the DOM elements, according to a predefined frame rate, to generate, at the frame rate, frames of a dynamic video including the video and audio elements; syncing audio and video-footage playback to the frames; and consecutively displaying the frames of the dynamic video in the web browser.

BRIEF DESCRIPTION OF DRAWINGS

For a better understanding of various embodiments of the presently disclosed subject matter and to show how the same may be carried into effect, reference will now be made, by way of example, to the accompanying drawings. Structural details of the presently disclosed subject matter are shown to provide a fundamental understanding of the presently disclosed subject matter, the description, taken with the drawings, making apparent to those skilled in the art how the several forms of the presently disclosed subject matter may be embodied in practice. In the figures.

DETAILED DESCRIPTION

Embodiments of the presently disclosed subject matter provide a system and methods for presenting dynamic, data-driven videos in a web browser or other front-end interface. Such "dynamic videos" are dynamically modified in the web browser according to data specific to an end user of the web browser. Examples of dynamic changes might be: 1) personalization according to personal data associated with an end user, such as shopping preferences, demographic data, or geographic data; 2) real time updates such as recent news (e.g., stock market or sports results); 3) changes to a video flow ("story line") and video content, based on an end user's real time interactions with the video presentation. Typically, the web browser runs on a device such as a personal computer or mobile device.

Figure 1:
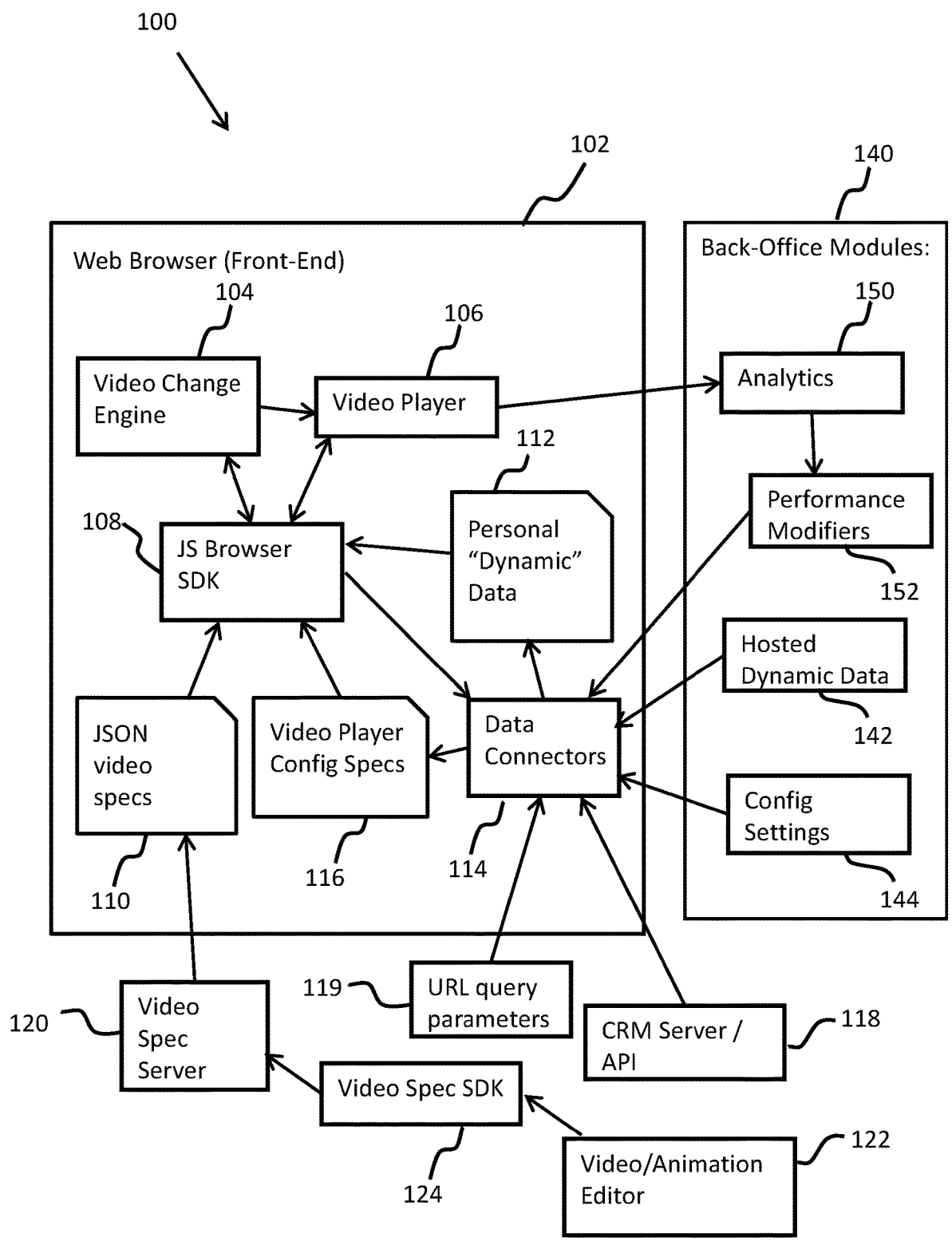
FIG. 1 is a schematic diagram of a system for presenting dynamic, data-driven videos in a web browser, in accordance with an embodiment of the presently disclosed subject matter.

FIG. 1 is a schematic diagram of a system 100 for presenting a dynamic video in a web browser 102 operated by an end user, in accordance with an embodiment of the presently disclosed subject matter. To implement the presently disclosed subject matter, the web browser 102, or any similar client-side platform configured to execute end-user applications, should support HTML5 technologies, including HTML5 capabilities of Scalable Vector Graphics (SVG) elements, Canvas element, in a Document Object Model (DOM) file, JavaScript, and video and audio support. Hereinbelow, the web browser is also referred to as the "front end" of the system, the front end in the sense that it is a platform implementing an end-user interface. The front end is a form of "edge computing," i.e., it is at an "edge" of the system, the edge at which the end user interacts with the system.

Software code running in the web browser implement steps of obtaining (e.g. receiving from an external source or locally generating) end-user specific data, applying the end-user specific data to generic video specifications, and presenting the generated, end-user specific video to the end user. The video specifications are typically obtained (e.g. received) by the front end from a web server, the address of which (i.e., the Uniform Resource Locator, or "URL" of the web server) being typically specified by the end user. The software code executed by the front end may be written in JavaScript, or, additionally or alternatively, any other client-side executable software language. This front-end executed code may be implemented as three modules, a video change engine 104, a video player 106, and a front-end software developer kit (SDK) 108.

The video change engine 104 is configured to obtain (e.g. receive from an external source or locally generate) a video specification 110. The video specification 110 is typically coded in JavaScript Object Notation (JSON) format, or XML format, or other hierarchical, easily parsed, textual formats. The video specification 110 includes definitions of the elements that will be used to create the dynamic video, including elements that are dynamic and will be modified by the video change engine 104. After the video specification 110 is modified by the video change engine 104, it is processed by the video player 106 to create the dynamic video presented to the end user.

The SDK 108 typically provides an interface between the front end and external servers, such as a video specification server 120 and data servers 118. The external servers provide the video specification and other data described hereinbelow.

The video specification 110 includes definitions of elements that will appear in the dynamic video presented to the end user, including definitions of dynamic elements that will be changed by the change engine 104, and their styling, positions and movements in the video that is presented to the end-user. Dynamic (i.e., replaceable) elements may include not only graphical elements themselves but traits of graphical elements such as text strings, text sizes, colors, visibility (or invisibility), speed of movement, etc. The video specification also defines interface controls, such as web links or call-to-action call-back functions. Such controls may be associated with screen positions and/or graphical elements. Controls may be executed interactively by end users while a video is playing (for example, by clicking on an object appearing in the video). A callback function is a function that, for example, may cause the front end to navigate to and present a new web page, or which may cause the dynamic video to jump to a different time position, or to dynamically change parts of the video content itself.

The video specification may also include links to additional content, or "assets," which may be incorporated into the dynamic video or assist in its creation, such as font files and font configuration definition (for example, woff files and css font-face definitions), video clips (for example, in mp4 format), images, and audio, together with the timing of the appearance of these elements within the animation, their styling, their movement and their interactive behavior. Such content may also be selected according to characteristics of the end user, or according to the specific identity of the end user, as described below.

The video specification may also include instructions to the change engine, specifying conditions affecting how changes are to be made. For example, a dynamic video may be sent to a user after playing a mobile game. At the end of the game, a won/loss status flag may be stored as dynamic data accessible to the dynamic video's change engine. The video specification may include logic specifying that certain elements are to be changed depending on the won/loss status. If the end user won a game, the change engine may be instructed to insert "won" text in a greeting message in the video specification, for example, a text string, "Congratulations!" If the end user lost, the message may be changed to, "Good luck next time.", and a scene may be added to the video with encouragement to play again.

For dynamic text changes, the video specification may also include some limitations on the text length, so the change engine can calculate the maximum allowed length of a text string at a certain position, and if the text would be too long, to scale the font down.

A base design of the video specification is typically prepared by a human editor, who may use an animation editing platform 122. An example of such an animation editing platform is Adobe AfterEffects™ (hereinbelow, "AE"). The base design is typically converted to a textual form such as a JSON formatted file before further processing is done. Next, the base design may be edited by a human editor using a dedicated software package "playground." The playground can be used typically within the video-editing software (for example, as an extension within AE), or by altering the converted JSON design with dedicated web software. The playground may be used by a human editor to label dynamic elements that will be changed and to add instructions for the change engine on how changes are to be applied. In addition, the human editor may label elements that will be interactive. The playground output is the video specification 110 that is transferred to the front end.

The SDK 108, like the video change engine 104 and video player 106 is typically coded in JavaScript. The SDK 180 is configured to obtain (e.g. receive from an external source) the video specification from the video specification server 120, making the video specification available to the video change engine 104.

The video change engine 104 may also obtain (e.g. receive from an external source or locally generate) a record 112 of dynamic data that are to be substituted for dynamic elements in the video specification. The dynamic data may include data that is personalized for the end user, either based on personal information of the end user, or on dynamic data that changes according to such factors as geographic location and time, or as dynamic data that matches any kind of a company's entities and states—such as its products, product images, services, prices, etc. As another example, dynamic data may include substituting a graphic background of the sky according to current weather conditions in the location of the end-user. In other words, the video specification defines a general blueprint for the video, without personalized content that is substituted into the specification in real time at the front-end platform, after the video specification is obtained (e.g. received) at the front-end platform (i.e., "the front end").

The type and quantity of dynamic data (including personal data) substituted into a given video specification will depend on the purpose of the video. For example, when the dynamic video is associated with a shopping application, the dynamic data may include the end user's name, which is used to modify personalized greetings, as well as preferences of the end user, such as preferred colors and materials for clothing. Dynamic data may include images, video clips and prices of recommended shopping items or of items previously selected by the end-user. When the dynamic video is associated with a bill received by an end user, such as an electricity bill, the dynamic data may include the end user's billing information, such as electrical usage and monetary charges The dynamic video may present such data as an animated graph, with interactive controls that the end user can click (i.e., "activate") to modify the video content. When clicked, interactive controls may present drill-down information, or display different scenes. Dynamic data may also be configured for a category of end user, providing dynamic data according to end user groupings. For example, certain dynamic data may be configured for a given end user according to the end user's geographic or national location.

Dynamic data 112 is typically retrieved for the web browser by data connectors 116, implemented in the front end to interface with sources of personal information. Such sources may provide information from an external customer relationship management (CRM) system or other API-accessible data source 118, or query parameters from a URL 119. Additional data sources may be provided by a "back-office" system 140 of the system provider, such data indicated as "hosted dynamic data" 142.

End-user preferences included in the dynamic data may be acquired from the end user directly, for example by providing the end user with a form by which to indicate preferences, or by acquiring the data through an associated application, such as a shopping application, as described above. Alternatively, or additionally, the system may analyze previous end-user interactions with dynamic videos. For example, a prior dynamic video may be a marketing video presenting different clothing fashions. An end-user's interaction with the video might include the end user's selections of types of clothing. Such preferences might be stored by the system for subsequent analysis and end user interaction. Such analysis may also correlate an end user's interactions with preferences indicated by other end users.

The video player 106 prepares and displays a dynamic video according to the video specification, after the video change engine 104 has made the dynamic changes described above. In particular, the video player generates HTML elements from graphical elements specified in the video specification. HTML definitions are typically stored in the DOM of the web browser for subsequent access when the dynamic video is played (i.e., presented to the end user). HTML definitions include vector-based animation that will generate SVG elements or Canvas elements, and include element traits, which may include element type (e.g., shape, circle, square, text, image, etc.), group (for group of types), as well as size (width and height), position (viewbox) and styling, such as fill color, opacity, invisibility or visibility, etc. HTML definitions will also include pixel-based content, which will generate image and video elements, and sound-based definitions, that will generate audio. As an example, the video specification may define an element position by rotation, scale and skew, which may be defined with the SVG definition as a transform matrix or with a container <g/> element definition. Shapes may be defined as <Path/> elements (e.g., a circle having a path defined by its center and radius). As a video is played, these attributes of position and size may change according to motion definitions in the video specification. The video that is played typically includes a combination of audio video, SVG elements, traits, and transformations and other DOM-based elements.

The video specification may also include effects such as filters, masks, clip-paths or other effects. When the front end supports such effects, the video player 106 may add these effect definitions to <defs/> definitions of the SVG elements, thereby linking the SVG elements to the specified effects. The HTML elements are typically added to the web browser's DOM according to a hierarchy and a layer order that are defined by the video specification. Elements may also be grouped (with the <g/> tag).

The video player 106 also preloads additional web content (i.e., "assets") that are specified in the video specification to appear within the video, such as video clips, audio, images, fonts, etc. Such assets are typically preloaded as "hidden elements." Such assets may be synchronized with vector-based elements appearance and/or movement. That is, video clips and audio assets may be set to run at different times, or in different parts of the video presented to the end user, as well as in custom position, rotation and movement. The video specification may define a start and end of each video and where along a timeline of the presented video the given asset will appear positioned. As the video clip asset is dynamic, and different viewers may receive different clips with different length, the video specification may also define whether the video should wait for the video clip to end, or should halt the video clip and continue with the animation. By setting times and playback definitions, the video player may maintain synchronization of video, audio, and animation elements. The video player may also calculate a speed of the network to which the end-user device is connected, and may choose an asset based on consideration of download speed. Also, a video played in the background may be downloaded at a lower resolution when the network is slow, or if the device is a mobile device. An image presented on top of the background may be loaded at a higher resolution.

Interactive actions, such as web links that may be selected by the end user, or function invocations, may also be associated with the HTML graphic elements, also according to definitions provided in the video specification.

Interactive actions of the end user, can also replace the current video specification with another one while playing the video. For example, a visual element within the video can be configured as a button, and once an end-user clicks on this button, the existing video is extended with a new scene (e.g. by creating a concatenated video definition from the existing video and another video definition), and the video temporal position is updated to the beginning of the new scene.

Video elements or layers can also be defined as form and inputs. At the time of the SVG creation, the element position is stored, and HTML elements such as input, form or select are placed on top of the SVG element, thus allowing the user to type-in text, or select from pre-defined options. The design of the HTML elements is updated to remove default styling, especially borders and background, and to match the definition of the layer in the video definition in terms of size, position, font, font-size, color etc.

Furthermore, input collected from the end user (e.g. as described in the previous paragraph) can be used as dynamic data and update the video for the end user. For example, a video definition may specify a text layer saying "please insert your name here" as input element, and the user can type his name inside the element. Once the user finishes typing his name (e.g. "Kevin") another layer of the video can be updated with the user name, saying "hello Kevin".

Because different browsers may have different limitations, the display of video elements stored as SVG may result in errors in presentation. For example, a video may be placed over SVG elements, hiding the elements instead of displaying them. The video player may be configured to check a browser's limitations, and place the video clip beneath the SVG elements. The video player may also calculate the position and transformation of the SVG elements in unison in ensure proper presentation. Assets, timing, and interactive actions may also be defined to be dynamic, that is, as traits that may be changed by the video change engine according to dynamic data.

In some cases, the video player can detect browsers limitations, and replace non-supported features with code-polyfills, visual alternatives or with alternative user experience. For example, the player may hide a full-screen button where it is not supported, or replace grayscale effect with lowered opacity and black background where needed.

Figure 3A:
FIGS. 3A-3C, 4A-4D, 5A-5B, and 6A-6B are screenshots showing results of web-based, dynamic processing of video specifications, in accordance with an embodiment of the presently disclosed subject matter.
Figure 3B:
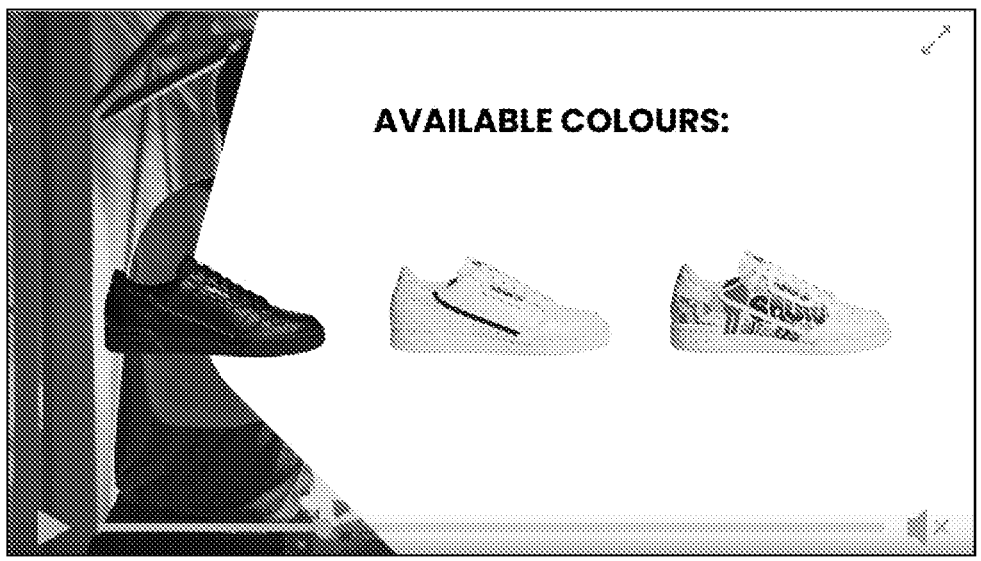
Figure 3C:
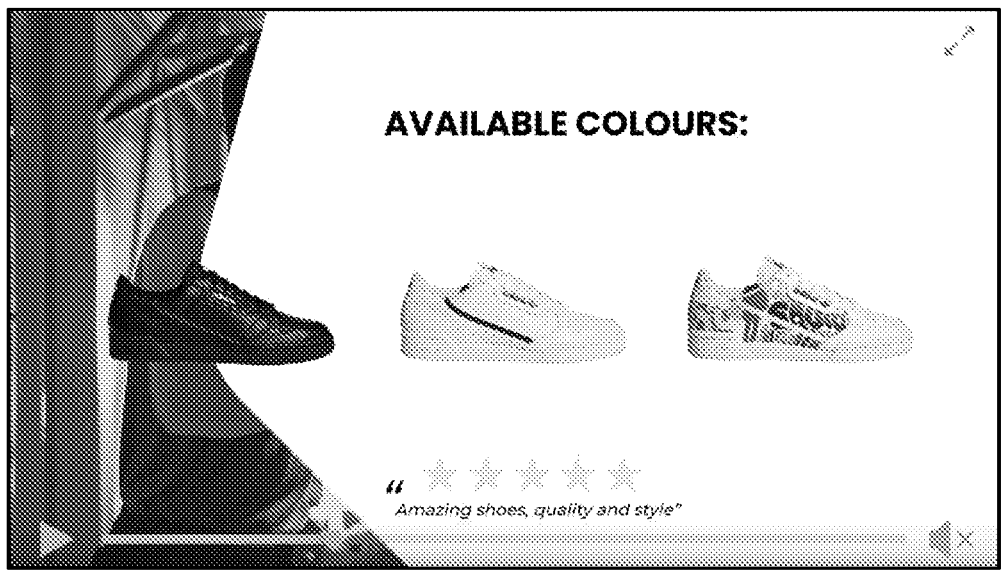

The video player 106 may also obtain (e.g. receive from an external source or locally generate) multiple video specifications and combine the multiple video specifications as layers of a merged video specification (also typically in JSON format), by which multiple elements appear on the screen of the front end at the same time. Additionally, or alternatively, the video player may obtain (e.g. receive from an external source or locally generate) multiple video specifications that are to be concatenated into a sequence of video specifications, defining sequential videos that will be presented to the end user. That is, each video specification of the multiple video specifications may be considered as defining a scene of a multi-scene video. A video player configuration specification 116, which may be provided by configuration settings 144 provided by the back-office system 140, or by dynamic user data, may define which scenes to show and in which order. Consequently, a variety of different videos may be presented to different end users according to such back-office settings and other data input, which may be changed according to end user characteristics. (FIGS. 3A-3C show examples of changing a "widget" of a scene according to user characteristics.)

In addition, the video player can choose a video scene with design that best fits the mobile device orientation. For example, several video definitions can be predefined, with similar responsive design, and a for a mobile device in portrait orientation, a video specification that matches a horizontal design will be loaded.

The back-office configuration settings may also control other modifiable settings of the player, such as interactive controls and a "skin" (i.e., a "look and feel") for the video. Interactive controls may include, for example, controls for play/pause, a video timeline bar, a full screen option, and a replay option. Such settings may be managed and changed manually or automatically, as determined appropriate by system providers operating the back-office system. Configuration settings may also define the sources for the dynamic data.

The video player 106 implements the configuration settings described above. Additional configuration setting may include: determination of an HTML container in which to present the dynamic video; attributes of a "player skin" (e.g., colors for buttons, or "story" functionality, with navigation controls to change scenes, etc.); a "thumbnail" or "poster" image representing the dynamic video (typically a frame of the video); a video orientation (horizontal or vertical); alignment of the video within a device display; autoplay settings; configuration of actions sent to an analytics module.

The analytics module 150 may be part of the back-office system and may be configured to analyze an end user's interaction with a dynamic video. When a personal video plays, data is sent to the analytics module regarding events such as: times of loading of executable code and data; time of play and pause of dynamic video; video playback analytics, such as scene changes and end of dynamic video; and end user interactions (i.e., clicking on interactive controls). Based on an analysis of an end user's interaction with a dynamic video (and other sources of end user characterization, and typically in comparison with interactions of other end users), the analytics module may create performance modifiers 152 to affect the dynamic data, so as to improve the end user interaction. For example, if a goal is to have end users click on a certain control button, the analytics module may determine where on the screen, or what color or size, is most effective in encouraging such an end user response, based on an analysis of a given end user's responses, or of multiple end users. The performance modifiers 152 may then be configured (manually or automatically) to include dynamic (personal) data to better achieve the desired end user response. That is, dynamic data may include data to modify the video specification to achieve the desired customer response goal. In addition, variations to the video specification may also be made in order to create different dynamic videos, so as to compare which element traits are most successful (e.g., one control button may be clicked 50% of the time when placed on a page with element trait X, but only 20% on a page with element trait Y). Machine learning techniques may be applied to correlate end user characteristics with successful element traits, to determine dynamic data most likely to achieve desired customer interaction.

After the video player 106 completes the steps described above of preparing for the presentation of the dynamic video, including generation of the HTML elements, the video player presents the dynamic video in the front end, on a frame-by-frame basis, at a preset frame rate. Typically, a function such as the JavaScript function Window.requestAnimationFrame( ) is executed to initiate the generation of each frame. For an animation configuration that specifies a frame rate of 30 frames per second (FPS), a difference between a current time and the time of the generation of a previous frame is calculated, and when the difference is 33 milliseconds (i.e., 1 second/30 frames), a new frame is initiated and the following actions are performed: synchronized temporal positions of video-clips and audio are calculated according to animation configuration, and played; and a screen image is generated manipulating keyframe and motion values.

Frames may include a change function for graphical values between keyframes defined in the video specification. For example, if a keyframe 0 defines a graphical element as a black triangle, 0 px from the left of the window, and at keyframe 10 as a white triangle 100 px from left side, with a linear change function, then frame 0 of the video will present the graphical element as black at 0 px from the left, while frame 1 may be generated to show a lightening of the color, for example to a dark gray that is 90% black, at a position of 10 px from the left. Frame 2 may be generated to show the element at 20 px and a lighter gray, and other similar graphical modifications.

In calculating graphical element positions for each frame, the video player may calculate Bezier curves for nonlinear function changes. Color values may also be changed according to linear or nonlinear gradient changes. For each frame, based on translation, rotation, and scaling of graphical element positions, an appropriate transform matrix is calculated by multiplying a current matrix with a change matrix. The transform matrix is applied to the element definition.

Figure 2:
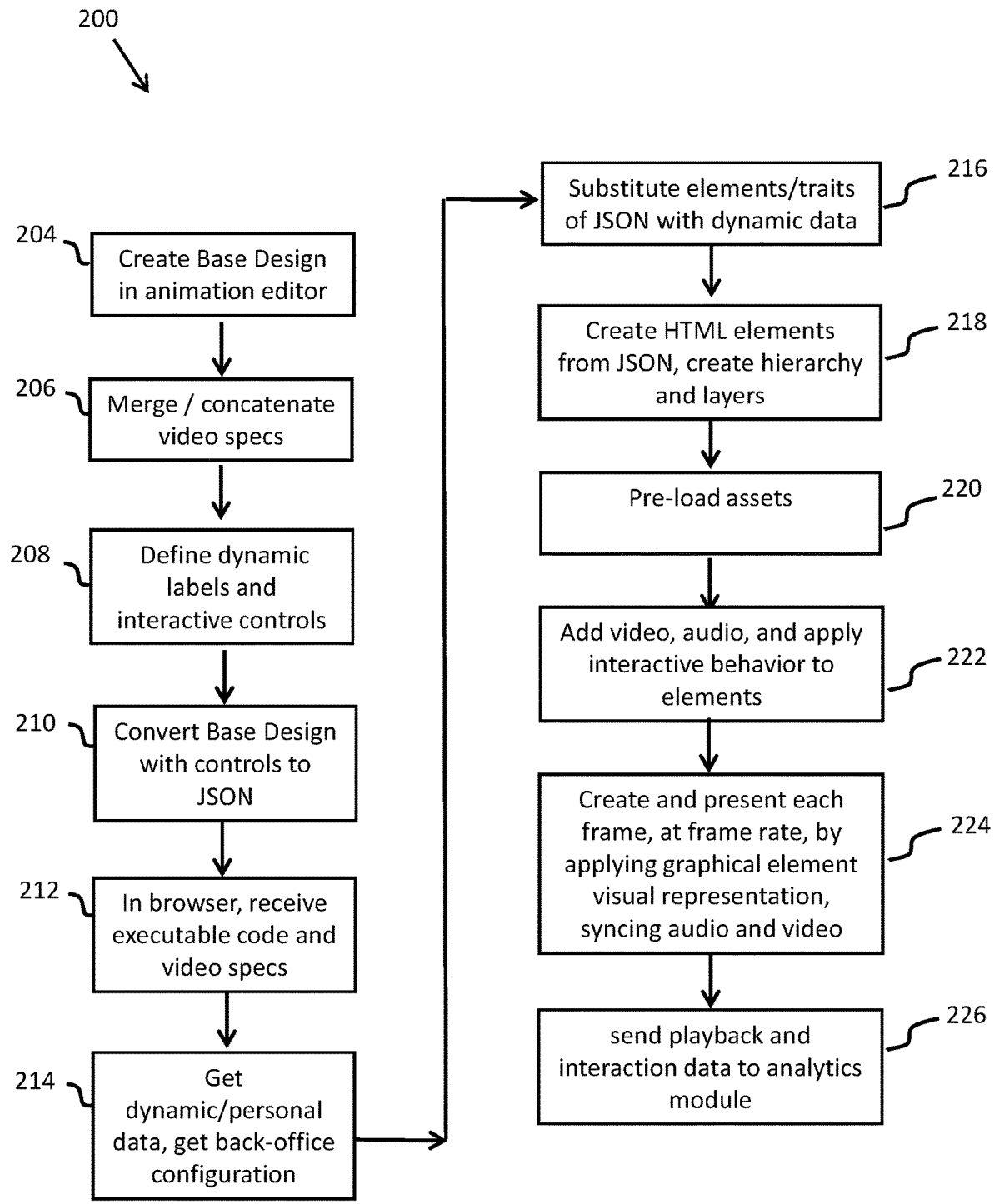
FIG. 2 is a schematic flow diagram of a process for presenting dynamic, data-driven videos in a web browser, in accordance with an embodiment of the presently disclosed subject matter.

FIG. 2 is a schematic flow diagram of a process 200 for generating and presenting dynamic, data-driven videos in a web browser, in accordance with an embodiment of the presently disclosed subject matter. As described above, some of the steps of process 200 may be implemented by software code executed in a web browser of an end user device, such as a personal computer or mobile device. The process includes generating a dynamic video based on dynamic data and a video specification, which are obtained (e.g. received) by the web browser. (As described above, the term web browser used herein refers to any front-end platform supporting web browser standards.)

At a first step 204, a "base design" of a video specification is created in an animation editing platform. As described above, the base design defines graphical elements that will appear in the dynamic video, as well as definitions regarding how those graphical elements will move and change visual traits. The base design also includes additional labelled traits of elements that may be replaced by dynamic data, such as: text strings, text sizes, colors, visibility (or invisibility), speed of movement, etc., and interface controls, such as web links or call-to-action call-back functions. The base design may also include additional content, or "assets," that may be incorporated into the dynamic video, and which also may be personalized, according to the configuration settings described above. At a step 206, additional video specifications, defining additional layers and scenes, may be merged or concatenated, either in the animation editing platform or with the playground software described below. Merged and/or concatenated specifications facilitate easy creation and enhancement of dynamic videos, as described further below with respect to FIGS. 3-6.

Next, at a step 208, "Playground" software, either within the editing platform, or in a dedicated software package operated before JSON conversion, may be used to apply further labels of dynamic elements and controls to the base design to create an edited video specification defining the dynamic, data-driven video that will be presented to end users. Typically, the edited video specification is then converted to a JSON file format at a step 210 before being made available for downloading to an end user's web browser.

Next, at a step 212, in response to the end user linking to a web site from which to obtain a dynamic video, the executable code described above, including the video change engine 104 and the video player 106, are received by the end user's web browser. The executable code then downloads (or otherwise obtains) the video specifications and also downloads (or obtains from data already collected by the web browser), at a step 214, the dynamic data, e.g., personal data, personal preferences, or time- or location-related data. As described above, sources for the dynamic data, typically accessible by APIs, may be defined by configuration settings that the executable code may also access, typically from a back-end system. Dynamic data may also be modified by the back-office system to achieve goals with respect to end-user interaction and end-user satisfaction.

At a step 216, the video change engine replaces, for each property of received dynamic data, the corresponding element or parameter in the video specification, thus generating a "custom video specification." This replacement process may also include concatenating multiple video specifications, similar to the process described above with respect to the step 206, but performed by on the client side, i.e., in the web browser.

At a step 218, the video player scans the personalized video specification to prepare the dynamic video that will be presented in the web browser. The preparation includes generating HTML graphical elements, which are then stored in the DOM of the web browser for subsequent access when the dynamic video is played. As described above, HTML definitions include elements and traits; traits may include type, shape, group, size, position, transformation and styling. The video specification may also include temporal changes to traits, based on keyframes and change function between keyframes. HTML definitions may also include the interactive controls defined in the video specification, as described above. HTML definitions may also include video player controls, which may be provided by the "back-office" system 140 described above. These may include timeline controls (e.g., a play/pause button, a mute butter, a slider for time, etc.), as well as a video player "skin."

At a step 220, the video player further prepares for the presentation of the dynamic video by preloading additional web content (i.e., loading before playing). This content (also referred to herein as the "assets"), may include videos, audio, images, fonts, etc. At a step 222, timing for the playing of the content, whether played automatically or triggered by end-user controls, is also stored with the elements as described above. The video player also receives configuration settings that set the "look and feel" of a window in which the dynamic video is presented. Additional interactive controls may also be set by the configuration settings.

At a step 224, each frame of the dynamic video is generated and presented from within the web browser to the end user. At a step 226, end user interaction may also be sent to the analytics module (150) as a mechanism of auto-improving the end user interaction, as described above.

FIGS. 3A-3C show web browser screenshots that demonstrate a process of merging video specifications into multiple layers of a merged video specification, in accordance with an embodiment of the presently disclosed subject matter. FIG. 3A (showing product star ratings) and FIG. 3B (showing product options) are merged as separate layers to create the merged video specification shown in FIG. 3C.

Figure 4A:
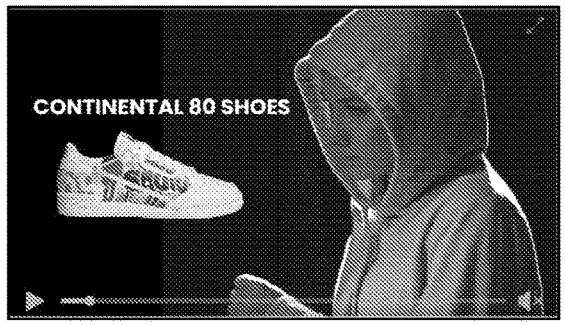
Figure 4B:
Figure 4C:
Figure 4D:
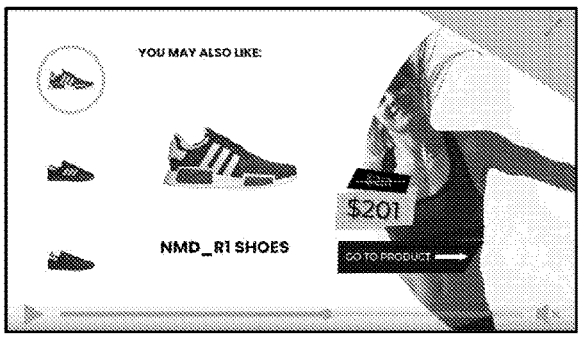

FIGS. 4A, 4B, 4C, and 4D show web browser screenshots that demonstrate a process of concatenating video specifications as multiple scenes of a concatenated specification, in accordance with an embodiment of the presently disclosed subject matter. A video player timeline at the bottom of each screen shows how the scenes are space out over time. The particular video shown is a fashion showcase video. The four scenes shown, as consecutive screens, are an intro screen (FIG. 4A), a product review screen (FIG. 4B), a product option screen, with different shoe colors shown (FIG. 4B), and a screen of related products for sale (FIG. 4D). The third and fourth screens, showing the product options and the related products, would typically be personalized with dynamic elements. For example, the shoe options in the video specification for the dynamic video would be replaceable at run-time (i.e., by the change engine, after the video specification and the dynamic data is obtained (e.g. received)). The shoe options would be replaced with shoe options that would be based on the end user's indicated preferences, such as color preferences. Also, the final screen of related products might show a screen determined by the analytics module to be especially appropriate for the given end user, given previously determined characteristics of the end user. The configuration settings might also be set to change the order or skip certain scenes, for example skipping the introduction. Note that the third screen with shoe options also includes the merged layers described above with respect to FIG. 3C. The configuration settings might also be set to not include the star layers. Video playback controls, such as play and pause, full screen, video timeline, and audio mute/unmute, are shown in FIG. 4B.

Figure 5A:
Figure 5B:

FIGS. 5A and 5B are screenshots showing results of dynamic customization of a web-based video, in accordance with an embodiment of the presently disclosed subject matter. The screenshots indicate a scene of a dynamic video that has been personalized differently for different end users. Personalization differences can be seen in the product images, as well as in the visible/invisible trait of a discount layer (showing 20% off in FIG. 5A but not in FIG. 5B), in the color of the price tag (yellow vs. red) and in text changes for the title, price, and product description.

Figure 6A:
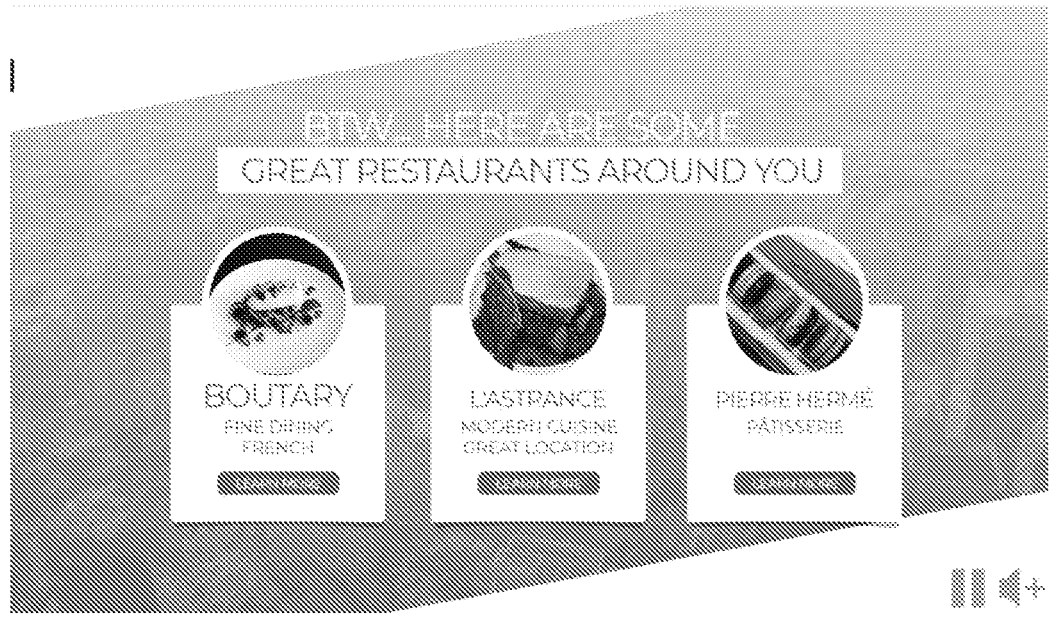
Figure 6B:
Figure 7:
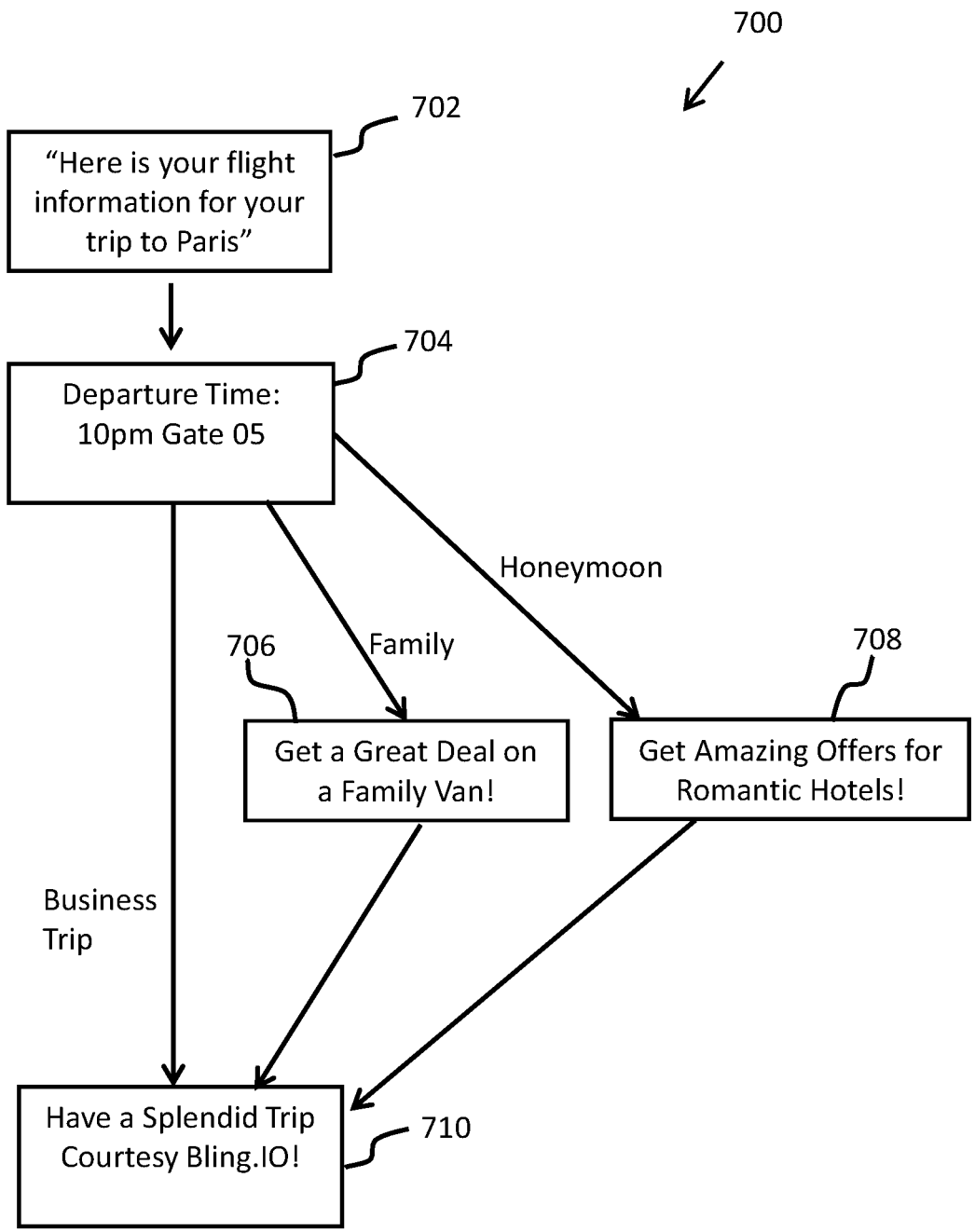
FIG. 7 is a schematic flow diagram of a "story line" of a dynamic, data-driven video, in accordance with an embodiment of the presently disclosed subject matter.

FIGS. 6A and 6B show web browser screenshots that demonstrate a process of linking interactive controls with graphical elements, in accordance with an embodiment of the presently disclosed subject matter. Each of the graphical elements in FIG. 6A is linked to a related webpage. Hovering over the middle graphical element, which shows a short description of a restaurant, causes the video to show "opening" animation for this element with detailed content related to the restaurant. Clicking the button inside the graphical element causes the web browser to load a new page shown in FIG. 6B. Similarly. FIG. 7 shows multiple "scenes" of a dynamic video 700, showing the generation of alternative "story lines," that is, alternative scene progressions, depending on dynamic data. After two introductory screens, 702 and 704, the video progression is determined by personal data, in this case by an end user's reason for a trip. If the reason is family, a scene 706 is presented. If the reason is a honeymoon, a scene 708 is presented. If the reason is neither of the above, the video continues from scene 704 to scene 710. Scenes 706 and 708 also continue at scene 710.

It is to be noted that although the presently disclosed subject matter has been described with reference to websites, web applications, DOM, this is by no means limiting and other types of implementations are contemplated as well. One such alternative is computerized applications that can be executed on a device having processing capabilities, such as a smartphone, a personal computer, a laptop computer, a smart television, a smart watch, etc. It is noted, that such implementations are not limited to a specific coding language (such as JavaScript) or to a specific visual format (e.g. SVG) but can be defined in any programing language, operating system or visual tool, such as Android, IOS, canvas, or any other suitable alternative.

It is to be understood that all or part of system 100 and of the dynamic video creation process 200 may be implemented as a computing system in digital electronic circuitry, or in computer hardware, firmware, software, or in combinations thereof. The computing system may have one or more processors and one or more network interface modules. Processors may be configured as a multi-processing or distributed processing system. Network interface modules may control the sending and receiving of data packets over networks. Security modules control access to all data and modules. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media.

Method steps associated with the system and process can be rearranged and/or one or more such steps can be omitted to achieve the same, or similar, results to those described herein. It is to be understood that the embodiments described hereinabove are cited by way of example, and that the presently disclosed subject matter is not limited to what has been particularly shown and described hereinabove. Rather, the scope of the presently disclosed subject matter includes variations and modifications thereof which would occur to persons skilled in the art upon reading the foregoing description and which are not disclosed in the prior art.

The invention claimed is:

1. A method for generating dynamic, data-driven videos in a web browser accessed by an end user, the method comprising:

obtaining a video specification including definitions of visual and/or audio elements, their temporal changes, and interactive controls; and providing a web browser-based program, configured, when executed by a processor, to implement steps of:
receiving the video specification;
receiving dynamic data associated with an end user of the web browser;
changing traits of one or more of the definitions in the video specification according to the dynamic data;
converting the visual and audio elements and their traits in the video specification to elements in a Document Object Model (DOM) of the web browser;
applying movement and styling of the video and audio elements defined in the video specification to the DOM elements, according to a predefined frame rate, to generate, at the frame rate, frames of a dynamic video including the video and audio elements;
syncing audio and video-footage playback to the frames; and
consecutively displaying the frames of the dynamic video in the web browser.

2. The method of claim 1, wherein the web browser-based program is coded in JavaScript and wherein the video specification is formatted as JavaScript Object Notation (JSON).

3. The method of claim 2, wherein traits of elements in the JSON video specification include labelled definitions of one or more of a text string, a text size, a graphical element color, a video file, an image, a visibility or invisibility trait of a graphical element, a speed of movement of a graphical element, a call-to-action callback instruction, and an interface control.

4. The method of claim 1, wherein the video specification is: (a) a merged JSON video specification created by receiving multiple JSON video specifications and merging them as multiple simultaneous layers of the merged JSON video specification, (b) a concatenated JSON video specification created by receiving multiple JSON video specifications and concatenating the multiple JSON video specifications as scenes of the concatenated JSON video specification, or (c) a JSON video specification created by converting output of an animation editing platform to a JSON format.

5. The method of claim 1, wherein receiving the dynamic data comprises getting one or more of text, personal information, and images, from one or more of 1) content loaded with loading of webpage, and 2) connections to other internet accessible sites by application programming interfaces (APIs).

6. The method of claim 1, further comprising receiving a parameter of performance with respect to a response of the end user to the dynamic video and responsively modifying the dynamic data to improve the performance.

7. The method of claim 1, further comprising pre-loading one or more audio and/or video files specified in the video specifications and presenting in the web browser frames of the audio and/or video files synchronized as additional layers with the frames of the dynamic video including the SVG elements.

8. The method of claim 1, further comprising defining, in the DOM, interactive parts and elements with one or more call-back functions, wherein the call-back functions: (a) perform one or more of navigating to a web page and jumping to a different scene of the dynamic video, or (b) are directed by pre-defined logical conditions.

9. The method of claim 1, wherein creating the SVG elements further comprises: (a) creating one or more SVG effect definitions of a filter, a mask, or a clip-path, (b) creating a container <g/> element in the DOM file, or (c) creating a transform matrix specifying one or more of a position, translation, rotation, scale, and skew of the SVG elements.

10. The method of claim 1, wherein converting the definitions of graphical elements in the video specification to SVG elements comprises defining element types and styles of the SVG elements.

11. A system for generating dynamic, data-driven videos in a web browser, the system comprising a processor and associated memory including instructions that when executed by the processor implement steps of:
obtaining a video specification including definitions of visual and/or audio elements, their temporal changes, and interactive controls; and
providing a web browser-based program to implement steps of:
receiving the video specification;
receiving dynamic data associated with an end user of the web browser;
changing traits of one or more of the definitions in the video specification according to the dynamic data;
converting the visual and audio elements and their traits in the video specification to elements in a Document Object Model (DOM) of the web browser;
applying movement and styling of the video and audio elements defined in the video specification to the DOM elements, according to a predefined frame rate, to generate, at the frame rate, frames of a dynamic video including the video and audio elements;
syncing audio and video-footage playback to the frames; and
consecutively displaying the frames of the dynamic video in the web browser.

12. The system of claim 11, wherein the web browser-based program is coded in JavaScript and wherein the video specification is formatted as JavaScript Object Notation (JSON).

13. The system of claim 12, wherein traits of elements in the JSON video specification include labelled definitions of one or more of a text string, a text size, a graphical element color, a video file, an image, a visibility or invisibility trait of a graphical element, a speed of movement of a graphical element, a call-to-action callback instruction, and an interface control.

14. The system of claim 11, wherein the video specification is: (a) a merged JSON video specification created by receiving multiple JSON video specifications and merging them as multiple simultaneous layers of the merged JSON video specification, (b) a concatenated JSON video specification created by receiving multiple JSON video specifications and concatenating the multiple JSON video specifications as scenes of the concatenated JSON video specification, or (c) a JSON video specification created by converting output of an animation editing platform to a JSON format.

15. The system of claim 11, wherein receiving the dynamic data comprises getting one or more of text, personal information, and images, from one or more of 1) content loaded with loading of webpage, and 2) connections to other internet accessible sites by application programming interfaces (APIs).

16. The system of claim 11, wherein the processor is further configured to receive a parameter of performance with respect to a response of the end user to the dynamic video and responsively modify the dynamic data to improve the performance.

17. The system of claim 11, wherein the processor is further configured to pre-load one or more audio and/or video files specified in the video specifications and present in the web browser frames of the audio and/or video files synchronized as additional layers with the frames of the dynamic video including the SVG elements.

18. The system of claim 11, wherein the processor is further configured to define, in the DOM, interactive parts and elements with one or more call-back functions, wherein the call-back functions: (a) perform one or more of navigating to a web page and jumping to a different scene of the dynamic video, or (b) are directed by pre-defined logical conditions.

19. The system of claim 11, wherein creating the SVG elements further comprises: (a) creating one or more SVG effect definitions of a filter, a mask, or a clip-path, (b) creating a container <g/> element in the DOM file, or (c) creating a transform matrix specifying one or more of a position, translation, rotation, scale, and skew of the SVG elements.

20. A non-transitory computer readable storage medium having computer readable program code embodied therewith, the computer readable program code, executable by at least one processor of a computer to perform a method for generating dynamic, data-driven videos in a web browser accessed by an end user, the method comprising:
  obtaining a video specification including definitions of visual and/or audio elements, their temporal changes, and interactive controls; and
  providing a web browser-based program, configured, when executed by a processor, to implement steps of:
    receiving the video specification;
    receiving dynamic data associated with an end user of the web browser;
    changing traits of one or more of the definitions in the video specification according to the dynamic data;
    converting the visual and audio elements and their traits in the video specification to elements in a Document Object Model (DOM) of the web browser;
    applying movement and styling of the video and audio elements defined in the video specification to the DOM elements, according to a predefined frame rate, to generate, at the frame rate, frames of a dynamic video including the video and audio elements;
    syncing audio and video-footage playback to the frames; and
    consecutively displaying the frames of the dynamic video in the web browser.

* * * * *